UNITED STATES PATENT OFFICE.

P. S. DEVLAN, OF JERSEY CITY, NEW JERSEY.

IMPROVED COMPOSITION FOR LINING JOURNAL-BOXES.

Specification forming part of Letters Patent No. 51,702, dated December 26, 1865.

*To all whom it may concern:*

Be it known that I, PATRICK S. DEVLAN, of Jersey City, county of Hudson, and State of New Jersey, have invented an Improved Composition for Lining Journal-Boxes and other Rubbing-Surfaces; and I do hereby declare that the following is a full, clear, and exact description thereof.

My invention consists of a compound of silicate of soda or potassa and vegetable fiber as a suitable lining for journal-boxes and other rubbing-surfaces, as I have discovered that it prevents heating and materially reduces friction.

For the preparation of the compound I take equal parts, by weight, of silicate of soda or potassa and vegetable fiber, (the latter I prefer to take in the state of pulp, such as is used for making paper,) and I thoroughly mix them until they form a plastic mass. In that condition I apply the compound as a lining to the inner surface of journal-boxes and other rubbing-surfaces, and the best mode of application is to form the surfaces which are to be lined with recesses, into which the compound in the plastic state is placed of sufficient thickness to spread over the residue of the surface when pressure is applied to compress the mass and render the surface of it smooth.

Although I prefer the proportions above specified, I do not wish to be understood as limiting my claim of invention to such proportions, as they may be varied without materially changing the result.

What I claim as my invention, and desire to secure by Letters Patent, is—

The compound substantially as described, as a lining for journal-boxes and other rubbing-surfaces, and consisting of silicate of soda or potassa and vegetable fiber.

P. S. DEVLAN.

Witnesses:
    ANDREW DE LACEY,
    WM. H. BISHOP.